Patented Aug. 14, 1945

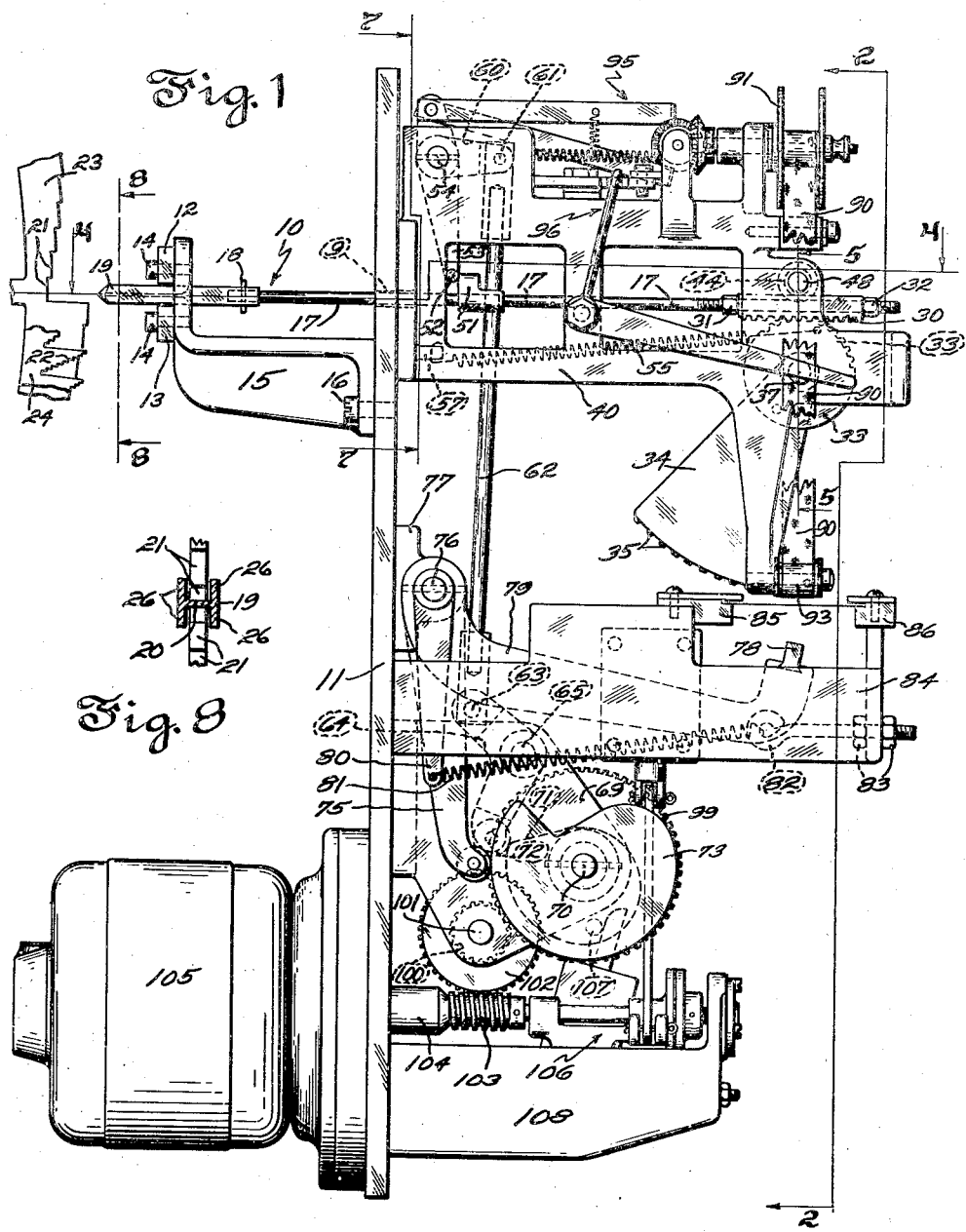

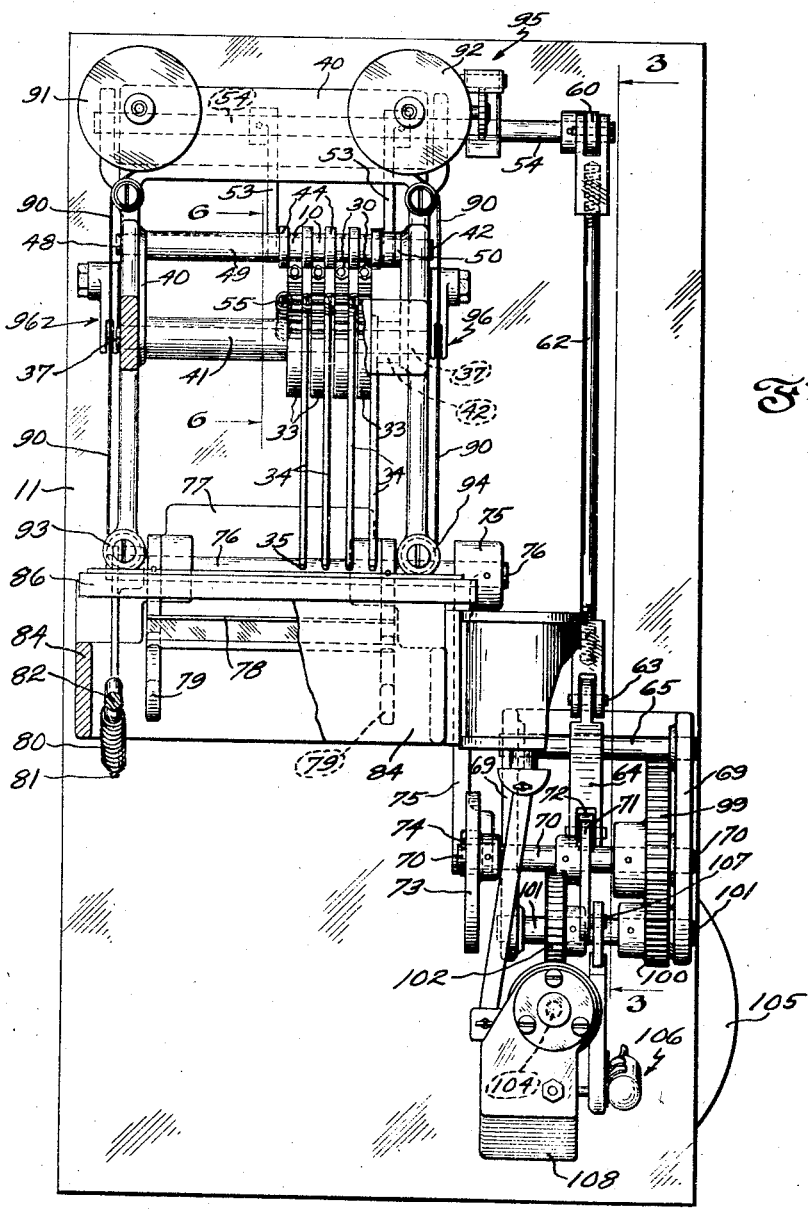

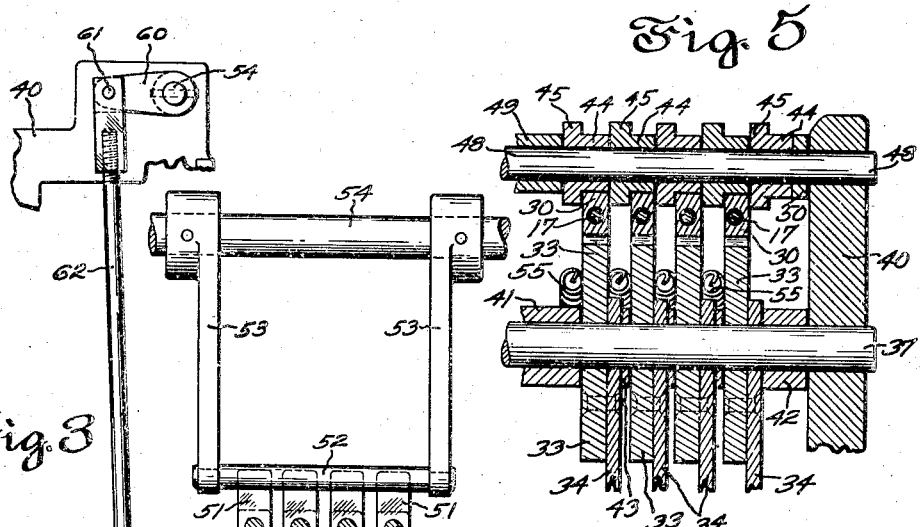
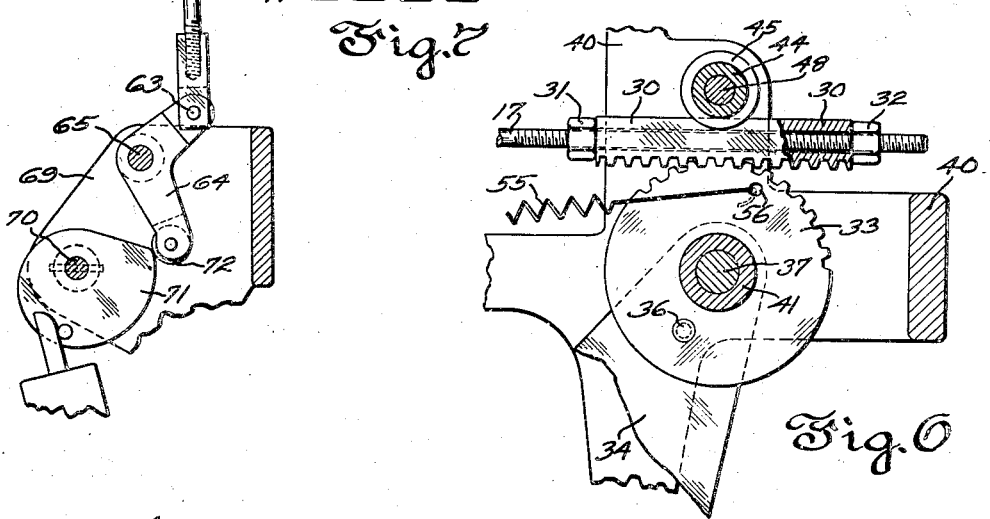
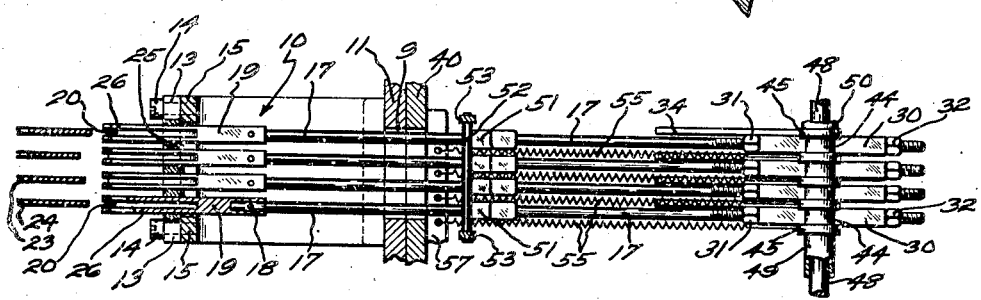

2,382,132

UNITED STATES PATENT OFFICE 2,382,132

PLAY ELIMINATIVE RECORDING MECHANISM

Oswald S. Carliss, Fairfield, Conn., assignor, by mesne assignments, to The Yale & Towne Manufacturing Company, Stamford, Conn., a corporation of Connecticut Application February 2, 1942, Serial No. 429,290

2 Claims. (Cl 234—5.4)

This invention relates to mechanism for setting up and striking an impression from movable type characters adapted to be differently positioned in accordance with different factors of incidence corresponding to such type characters, as for instance, different magnitudes of weight that may be registered by the load counterbalancing action of a weighing scale or other force measuring instrument.

Movable type carriers for this purpose have formerly been employed in the form of wheels or wheel segments pivoted to swing through a range of positions for selectively presenting their carried type opposite a printing platen. Positions to which such a segment may move for so positioning its type have formerly been determined by a feeler element caused to travel in unison with the type segment and caused while so traveling to sense graduated stops or the like and thereby become arrested in a correct position for printing. The feeler is commonly urged against a stepped wheel periphery by resilient means.

One object of the present improvements is to eliminate all possibility of certain play or lost motion in mechanism for operatively coupling together such type segment and such feeler element that has formerly resulted from wear or from the necessarily free operating fit of relatively movable parts.

Another object is better to steady the type character and hold it in accurate alignment while a printed impression is being struck therefrom.

Another object is to provide improved means for effecting micrometric adjustment of the position of the type in relation to the stop sensing end of the feeler element.

A further object is to provide a hammer-like striking platen for making an impression from such type characters and that may be composed of fewer parts than heretobefore. A related object is to provide a common power mechanism for motivating in designed sequence both the type segment and the impression striker and to locate such power mechanism relatively closer to the improved impression striker and relatively more remote from the feeler element.

A still further object is to link operatively together the relatively remote feeler element and power mechanism so that a simple push-pull rod by performing simple lengthwise movement may suffice to transmit the action of the power mechanism to the feeler element.

The foregoing and other objects of the present improvements will become clearer from the following description of an illustrative embodiment of the invention in which description reference is made to the accompanying drawings wherein:

Fig. 1 is an elevation of a complete type positioning and impression striking mechanism incorporating the present improvements.

Fig. 2 is a view looking at Fig. 1 in the direction of the arrows from the section planes 2—2.

Fig. 3 is a fragmentary view of certain parts in Fig. 2 viewed in the direction of the arrows from the section plane 3—3.

Fig. 4 is a plan view of the feeler elements showing associated parts in section on the plane 4—4 in Fig. 1.

Fig. 5 is an enlarged fragmentary view taken in section on the plane 5—5 in Fig. 1 looking in the direction of the arrows.

Fig. 6 is a view drawn on the same enlarged scale as Fig. 5 taken in section on the plane 6—6 in Fig. 2.

Fig. 7 is a fragmentary view on the same enlarged scale taken in section on the plane 7—7 in Fig. 1 looking in the direction of the arrows.

Fig. 8 is an enlarged view taken in section on plane 8—8 in Fig. 1 looking in the direction of the arrows.

The recording mechanism as a whole is divided into two main sections or sets of parts of which the upper section comprises the type registering mechanism and the lower section, considerably spaced therefrom, comprises the impression striking mechanism and includes a power activated hammer-like printing platen.

The type registering mechanism includes one or more horizontal feeler elements indicated as a whole by 10 mounted for free longitudinal sliding movement through oversize clearance apertures 9 in the main vertical frame plate 11. The heads 19 of these feeler elements are guided slidingly in horizontally spaced bearings provided in part by an upper horizontal bar 12 and a lower corresponding bar 13, which bars are secured by bolts 14 to bracket 15 which is mounted by bolts 16 on the frame plate 11. Feeler rod 10 is a composite member consisting of a long round threaded rod 17 assembled in end-to-end relation to feeler head 19 by a cross pin 18 holding the end of rod 17 within a snug fitting terminal socket in the feeler head. Head 19 may be square in cross section at its extreme left or sensing end in Figs. 1 and 4 thus providing a relatively thin blade 20 extending between side flanges 26 and which is adapted to be thrust into sensing contact with some one of the stops 21, 22. These stops constitute graduated steps on the periphery of one or more wheels 23 and 24 whose rotary position may be determined by the load counterbalancing mechanism of a weighing scale as is more fully disclosed in U. S. Patent No. 2,173,746 granted to G. E. Weist. Separator partitions 24 maintain the feeler heads 19 properly spaced laterally from each other so that the notched periphery of each wheel 23, 24 is accurately straddled by the side flanges 26 as the blade 20 advances into contact with some wheel step, as 21.

Rods 17 are threaded for a part of their length from the right end thereof in Figs. 1, 4 and 6 and each such rod carries slidably mounted on its threaded portion a bar-like gear rack 30 having an unthreaded hole lengthwise therethrough providing a snug slip fit on the outside diameter of the rod threads. Rack 30 is held in different adjusted positions lengthwise of rod 17 by means of a thrust nut 31 at its left end and a thrust nut 32 at its right end. Nuts 31 and 32 are not alone relied upon to keep the rack from rotating with respect to the rod as will be apparent hereinafter.

The teeth of each of racks 30 mesh with a partially toothed gear wheel 33 which flanks and is made fast to a type carrying segment 34. Each such segment, of which four are shown in the drawings, carries type characters 35 projecting from its downward disposed periphery and by means of one or more rivets 36 is fixed to gear wheel 33 so that each type segment swings always in unison with its gear wheel about a common shaft 37. Shaft 37 is supported by and spans the space between the side walls of an upper frame casting 40 mounted detachably upon the main vertical frame plate 11 by means of bolts (not shown). The four type segments shown in Figs. 2, 4 and 5 operate side-by-side individually and independently of each other, a long spacer collar 41 taking up the empty room at the left of the gear wheels 33 in Fig. 2, which collar may be reduced in length to admit any additional number of type segments which it may be desired to add to the assembly. End thrust is provided by spacer collar 41 and by a shorter spacer collar 42 and by the intermediate spacer washers 43 along shaft 37 as best shown in Fig. 5 and with sufficient looseness to permit free independent swinging movement of each gear wheel and type segment upon shaft 37.

Gear racks 30 are held downward and also held from lateral displacement in their mesh with gear wheels 33 by means of freely turnable rollers 44 each having a head flange 45 interposed between and flanking the flat sided surfaces of adjacent racks in a manner to confine the racks purely to lengthwise movement without exerting any friction in opposition thereto while at the same time preventing turning of the racks about the axis of rod 17. Guide rollers 44 are individually free to turn on a shaft 48 which is supported by and spans the space between the said left and right walls of the upper frame casting 40. Shaft 48 is equipped with suitable collars 49 and 50 for taking the axial thrust of rollers 44.

Each rod 17 of the feeler elements 10 carries fixedly thereon a spur-like propelled lug 51 in whose path of travel lengthwise with rod 17 there oscillates the propelling crossrod 52 of a swingable bail-like structure which includes two depending spaced arms 53 fixed respectively to opposite ends of the cross rod 52 and also fixed on a common rocker shaft 54. Like shafts 37 and 48, shaft 54 is supported by and between the side walls of frame casting 40.

According to the present improvements each gear wheel 33 is directly and constantly urged counterclockwise in Figs. 1 and 6 by the pull of a long extension spring coil 55 one of whose ends catches into a hole 56 through wheel 33 and the other of whose ends is attached to a frame lug 57 rigid with casting 40 or plate 11. Spring coil 55 extends lengthwise alongside feeler element 10 in which direction there is ample room for a maximum length of spring. Thus normally the cross rod 52, and at other times the stepped periphery of a notched wheel 23 or 24, serves to limit movement of each feeler 10 toward the left in Fig. 1 under the urge of spring 55. Thus is determined the angular position of type segments 34 which are thus controlled so as to present any one of the type characters 35 in the lowest or printing position vertically under shaft 37 so that an impression or record can be struck from that particular type character. The record so struck will thus be seen to accord with the longitudinal position of feeler 10.

For releasing spur lug 51 and thereby feeler element 10 to the constant pull of spring 55 acting through the gear teeth on wheel 33 and rack 30, the cross rod 52 is first swung toward the left in Fig. 1 and is later swung back to its original position shown in Fig. 1 to retract the feeler from the stepped disc after the printed record has been made. This is accomplished by back and forth turning of shaft 54 in timed relation to striking an impression from the type characters 35. For being so turned rocker shaft 54 extends well to the right of the frame casting 40, as best shown in Fig. 2, and thereat carries fixed upon it the short crank arm 60. Arm 60 is pivotally coupled at 61 to the rod-like link 62 whose lower end is pivotally coupled at 63 to a bell crank lever 64. Lever 64 is rotatably carried on a shaft 65 supported in the spaced side walls of a bearing bracket 69 which may be mounted as a detachable unit upon the main vertical printing plate 11 by means of bolts (not shown). Supported rotatably in the same bearing bracket 69 there is a cam shaft 70 to which is fixed a cam 71 whose periphery is followed by a roller 72 carried by the aforesaid bell crank lever 64.

Cam shaft 70 also carries fixed thereon at least one other cam 73 whose periphery is followed by a roller 74 carried at the end of a downward extending arm 75 which is fixed to the protruding end of a hammer shaft 76. This shaft is journaled in a separate bracket 77 detachably mounted on the main vertical frame plate 11 by bolts (not shown). The printing hammer includes a platen bar 78 supported at the free end of a double armed bail-like structure 79 fixed on shaft 76 to swing in unison with the follower arm 75. Still another depending arm 80 is fixed on shaft 76 and is constantly urged in a counterclockwise direction in Fig. 1 by a long extension spring whose anchored end engages a hook 82 held adjustably on the bed bracket 84 by nuts 83. Bracket 84 is detachably mounted on frame plate 11 by bolts (not shown) and carries horizontal guideways 85 and 86 for directing and supporting a record blank, such as a cardboard ticket or paper tape, in proper position between the type segments 34 and the hammer platen 78 to receive a printed impression from the type.

An inked ribbon 90 traveling from one to the other of spools 91 and 92 is supported between the record blank and the type characters 35, and if desired, may be fed around guide rollers 93, 94 in alternately reverse directions by suitable mechanism represented only generally at 95. Associated mechanism represented generally at 96 may operate automatically to reverse the direction of feeding travel of ribbon 90 when actuated by some ribbon carried catch member in a conventional manner.

Cam shaft 70 is powered by means of a large spur gear 78 fixed thereon and driven by a pinion 100 fixed on a shaft 101 journaled in the side walls of bracket 69. Also fixed on shaft 101 is the worm wheel 102 driven by a worm 103 on the shaft 104 of an electric power motor 105 which may be bolted against the outer face of main frame plate 11. The latter is apertured to pass the motor shaft 104.

At 106 there are represented in general some of the parts of an electromechanical cycle stop power mechanism. These parts cooperate between motor shaft 105 and a cycle stop pin 107 carried by cam 73, to drive the cam shaft 70 one complete revolution counterclockwise from its position shown in Fig. 1 and then to stop the rotation of shaft 70 and cam 73 automatically in the position from which it started to rotate. Fuller details of a suitable cycle stop power mechanism for this purpose are disclosed in my copending application Serial No. 350,185, now U. S. Patent No. 2,370,686. A cradle bracket 108 is detachably mounted on the main frame plate 11 by bolts (not shown) to afford bearing support for the extreme right end of motor shaft 104 in Fig. 1.

The functions of the aforedescribed parts which are more particularly concerned with the present invention are mentioned in the following description of the recording apparatus as a whole. It is assumed, for example, that a load placed on the weighing platform of a pendulum scale (not shown) incorporating in its weight indicating or registering mechanism the stepped wheels such as 23, 24 has swung such wheels to a rotative position corresponding to the weight of the load. In such position a proper step, as 21, of each wheel stands stationed in the path of movement of the feeler head 19 toward the left in Fig. 1. Through suitable remote electrical control, of which an example is disclosed in my copending application Serial No. 350,185, electric motor 105 becomes energized and proceeds to rotate the cam shaft 70 counterclockwise in Fig. 1 through reduction gearing of the cyclic stop mechanism 106.

The consequent rotation of cam 71 first permits bell crank 64 to swing clockwise in Fig. 3 (counterclockwise in Fig. 1) under the urge of spring 55 as transmitted thereto through gear wheel 33, rack 30, rod 10, spur 51, crossrod 52, arms 53 and shaft 54. The ensuing lengthwise travel of the feeler head 19 toward the left in Fig. 1 will continue until the leading edge of blade 20 is arrested by stop 21. Thereafter, roller 74 will be forced abruptly into the notch in cam 73 by the pull of spring 81 on arm 80. This swings platen 78 smartly upward to force a record blank, which may be lodged in and span the space between guides 85 and 86, against the inked ribbon 90. This causes an impression to be recorded from whatever type character 35 on segment 34 occupies the printing position as determined by the extent of movement of the feeler element 10 toward the left in Fig. 1.

Continued running of motor 105 gradually withdraws feeler element 10 toward the right in Fig. 1 and simultaneously retracts the hammer arm 79 with its carried platen 78 in a clockwise direction as rollers 72 and 74, respectively, ride onto the high portions of their respective cams 71 and 73. Ultimately the parts continue to rotate until they have been restored to the same or an equivalent position as shown in Figs. 1 and 3. Thereupon, through the cycle stop power mechanism 106, current supply to motor 105 is automatically cut off and the mechanism comes to rest after having completed its described cycle of weight recording action.

In the above described series of operations attention is particularly called to the improvement wherein no looseness can enter into the cooperative action of feeler element 10 and type segment 34 because of the constant and complete take up of any play which might be present between the teeth of rack 30 and gear 33. The pull of spring 55 on gear 33 forces the teeth of the latter always toward the left in Figs. 1 and 6 and the same working surface of some gear tooth is always thrust into contact with the same surface of its corresponding rack tooth because the thrust of feeler 10 toward the left is constantly opposed either by crossrod 52, between recording operations, or by some step on the wheels 23 or 24 during the recording operation. When wear occurs between gear teeth on rack and segment and when spring 55 functions automatically to take up backlash resulting from this wear, nuts 31, 32 afford means to realign type 35 in a manner to compensate for such wear. The H-shaped cross section of the feeler head 19 shown in Fig. 8 renders the step engaging blade 20 rigid and incapable of accidental deflection upward or downward relative to the disc step that is first encountered in the movement of the feelers toward the notched discs.

Other features of improvement reside in the frictionless action of the freely rotatable guide wheels 44 upon the racks which they guide. These wheels hold the racks 30 down into full mesh with the teeth on gears 33. The enlarged heads or flanges 45 provide side thrust for the racks with less friction than would result from immovable slide bearings. The expedient of arranging the long vertical link 72 to move lengthwise for transmitting motion from the prime mover 105, 106 to feeler element 10 wherein an intermediate portion of the vertical reach of such link crosses an intermediate point in the horizontal reach of the long feeler element 10 will be observed to leave a horizontally deep printing station between platen 78 and ribbon 90 of maximum plan area for accommodating large record blanks. As thus accomplished, there is occasioned no increase in the space that would be required to contain the other essential parts of the complete recording apparatus alone.

It will occur to those skilled in the art that the guide wheel heads 45 may be composed of separate collar-like parts instead of integral with barrels 44, and that many other changes in the details of construction can be made without departing from the principles of construction and operation that give rise to the advantages which have been explained. Therefore, the following claims will be understood as intended to cover all substitutes and equivalents for the exact constructions shown herein which fall fairly within their terms.

I claim:

1. In recording apparatus, the combination of, an apparatus support frame, a type carrying segment pivotally mounted on said frame for swinging movement, a guideway on said frame, an elongated feeler element slidable lengthwise in said guideway, stops variably stationed to be sensed by said feeler element, gearing operatively associating said segment with said element for transmitting motion therebetween, and resilient means operatively connected to said segment in a manner to urge said segment to advance said element by means of said gearing into contact with one of said stops.

2. In recording apparatus, the combination of, an apparatus support frame, a type carrying segment pivotally mounted on said frame for swinging movement, a guideway on said frame, an elongated feeler element slidable lengthwise in said guideway, stops variably stationed to be sensed by said feeler element, a gear rack on said feeler element, spur gear teeth on said type carrying segment meshing with said rack, and resilient means connected to said segment in a manner to urge said spur gear teeth constantly against the meshing teeth of said gear rack in a manner to take up play in at least one direction therebetween, together with at least one guide wheel rotatably supported to turn about a fixed axis and to roll against a surface of the said gear rack opposite the said gear teeth of the type segment, thereby to maintain said rack at a constant and predetermined depth of mesh with said gear teeth.

OSWALD S. CARLISS.